United States Patent
Khait et al.

(10) Patent No.: US 12,480,915 B2
(45) Date of Patent: Nov. 25, 2025

(54) PLANT-MONITOR

(71) Applicant: Ramot at Tel-Aviv University Ltd., Tel Aviv (IL)

(72) Inventors: Itzhak Khait, Tel Aviv (IL); Raz Sharon, Tel Aviv (IL); Yosef Yovel, Tel Aviv (IL); Lilach Hadany, Tel Aviv (IL)

(73) Assignee: RAMOT AT TEL-AVIV UNIVERSITY LTD, Tel Aviv (IL)

( * ) Notice: Subject to any disclaimer, the term of this patent is extended or adjusted under 35 U.S.C. 154(b) by 629 days.

(21) Appl. No.: 17/270,016

(22) PCT Filed: Aug. 20, 2019

(86) PCT No.: PCT/IL2019/050932
§ 371 (c)(1),
(2) Date: Feb. 21, 2021

(87) PCT Pub. No.: WO2020/039434
PCT Pub. Date: Feb. 27, 2020

(65) Prior Publication Data
US 2021/0325346 A1    Oct. 21, 2021

Related U.S. Application Data

(60) Provisional application No. 62/719,709, filed on Aug. 20, 2018.

(51) Int. Cl.
*G01N 29/14* (2006.01)
*G01N 29/26* (2006.01)
(Continued)

(52) U.S. Cl.
CPC ......... *G01N 29/14* (2013.01); *G01N 29/262* (2013.01); *G01N 29/44* (2013.01); *G01N 33/0098* (2013.01); *G01N 2291/106* (2013.01)

(58) Field of Classification Search
CPC ...... G01N 29/14; G01N 29/262; G01N 29/44; G01N 33/0098; G01N 2291/106
See application file for complete search history.

(56) References Cited

U.S. PATENT DOCUMENTS

| | | | |
|---|---|---|---|
| 2011/0288689 A1 | 11/2011 | Kageyama | |
| 2012/0113225 A1* | 5/2012 | Deppermann | A01G 7/00 382/110 |

(Continued)

FOREIGN PATENT DOCUMENTS

CN    102394064    3/2012

OTHER PUBLICATIONS

Petr Dostal (Detection of Acoustic Emission Characteristics of Plant According to Water Stress Condition) (Year: 2016).*

(Continued)

*Primary Examiner* — Manish S Shah
*Assistant Examiner* — Sharad Timilsina
(74) *Attorney, Agent, or Firm* — A.C. Entis-IP Ltd; Allan C. Entis

(57) ABSTRACT

A system for monitoring plants, the system comprising: one or more sound collectors configured to receive and generate signals based on sounds that plants make; and a computer system configured to receive and process the signals to provide a profile of a plant producing the sounds.

20 Claims, 7 Drawing Sheets

(51) Int. Cl.
*G01N 29/44* (2006.01)
*G01N 33/00* (2006.01)

(56) References Cited

U.S. PATENT DOCUMENTS

| | | | | |
|---|---|---|---|---|
| 2012/0209612 | A1 | 8/2012 | Bilobrov | |
| 2016/0033943 | A1* | 2/2016 | King | G05B 13/021 |
| | | | | 700/28 |
| 2016/0206286 | A1* | 7/2016 | Roeder | A01M 1/026 |
| 2017/0032258 | A1* | 2/2017 | Miresmailli | G06N 5/04 |
| 2018/0017965 | A1* | 1/2018 | Kosa | A01D 46/30 |
| 2018/0275108 | A1* | 9/2018 | Cocker | G01N 29/348 |
| 2019/0200535 | A1* | 7/2019 | Regan | A01G 7/00 |
| 2021/0192911 | A1* | 6/2021 | Goes Gasparoto | G01B 7/12 |
| 2023/0078003 | A1* | 3/2023 | Edo | G06V 10/255 |
| | | | | 56/328.1 |

OTHER PUBLICATIONS

Detection_of_Acoustic_Emission_Characteristics (Year: 2016).*
Detection of acoustic emission characteristics of plant according to water stress condition (Year: 2016).*
David Ehret et al. Automated monitoring of greenhouse crops. Agronomie, EDP Sciences, 2001, 21 (4), pp. 403-414. 10.1051/agro: 2001133. hal-00886117 Herein after "Ehret" (Year: 2018).*
Mayr Stefan: "Thirsty plants send signals, Drought stress produces ultrasound", Biologie in Unserer Zeit, vol. 40 No. 6, Dec. 1, 2010, pp. 396-402, herein after "Mayr". (Year: 2010).*
Yann Salmon, "Understanding tree physiology under drought stress using ultrasonic acoustic emission" STSM—scientific report cost Action FP1106—STReESS, Jun. 18, 2013. (Year: 2013).*
W Jihye Jung et al. "Beyond chemical triggers: Evidence for Sound-Evoked physiological reactions in plants", Frontiers in plant science, vol. 9, No. 25, Jan. 30, 2018, pp. 1-7. (Year: 2018).*
Acevedo, Miguel A. et al.; "Automated classification of bird and amphibian calls using machine learning: A comparison of methods." Ecological Informatics 4, No. 4; Sep. 2009; pp. 206-214.
Vergeynst, Lidewei L. et al.; "Deciphering acoustic emission signals in drought stressed branches: the missing link between source and sensor." Frontiers in Plant Science vol. 6, Article 494; Jul. 2015.
Dostal P. et al.; "Detection of Acoustic Emission Characteristics of Plant According to Water Stress Condition"; Acta Universitatis Agriculturae et Silviculturae Mendelianae Brunensis; Oct. 2016; vol. 64, No. 5; pp. 1465-1471.
International PCT Search Report and Written Opinion dated Nov. 24, 2019 for PCT/IL2019/050932 filed Aug. 20, 2019.
Yann Salmon et al: "Understanding tree physiology under drought stress using ultrasonic acoustic emission", STSM—Scientific report Cost Action FP1106—STReESS, Jun. 18, 2013.
Jihye Jung et al: "Beyond Chemical Triggers: Evidence for Sound-Evoked Physiological Reactions in Plants", Frontiers in Plant Science, vol. 9, No. 25, Jan. 30, 2018 (Jan. 30, 2018), pp. 1-7.
Monica Gagliano: "Green symphonies: a call for studies on acoustic communication in plants", Behavioral Ecology, vol. 24, No. 4, Nov. 25, 2012 (Nov. 25, 2012), pp. 789-798.
Univ et al: "Noncontact ultrasound detection of exotic insects in wood packing materials", Forest Products Journal, vol. 55, No. 6, Jun. 1, 2005 (Jun. 1, 2005), pp. 33-37.
Ehret David L. et al: "Automated monitoring of greenhouse crops", AGRONOMIE., vol. 21, No. 4, May 1, 2001 (May 1, 2001), pp. 403-414.
Extended European Search dated Mar. 28, 2022 for European Application No. 19850938.2 filed Feb. 26, 2021.

* cited by examiner

|  | PREDICTED | | Number of recordings |
|---|---|---|---|
|  | tomato | noise | |
| TRUE tomato | 0.998 | 0.002 | 1622 |
| TRUE noise | 0.004 | 0.996 | 1378 |

Fig. 6A

|  | PREDICTED | | Number of recordings |
|---|---|---|---|
|  | dry | irrigated | |
| TRUE dry | 0.808 | 0.192 | 26 |
| TRUE irrigated | 0.12 | 0.88 | 25 |

Fig. 6B

PLANT-MONITOR

RELATED APPLICATIONS

The present application is a U.S. National Phase of PCT/IL2019/050932 filed on Aug. 20, 2019, which claims the benefit under 35 U.S.C. 119 (e) of U.S. Provisional Application 62/719,709 filed on Aug. 20, 2018 the disclosures of which are incorporated herein by reference.

FIELD

Embodiments of the disclosure relate to monitoring the condition of plants by listening to sounds that the plants make.

BACKGROUND

Modern agriculture that provides produce to feed the burgeoning global population is a complex industrial process that involves investment and management of natural and manmade resources such as land, artificial soil, water, sunlight, nutrients, and pesticides to promote plant growth that provides abundant, economic, crop yields. Plant health, growth rate, and crop yields are subject to variables, such as weather, disease, and insect infestations, which may be difficult to anticipate, and operate to make efficient provision and timely administration of the resources a relatively complex undertaking. Whether greenhouse, open field, or orchard agriculture, efficient and close monitoring of plant growth and health, and that of the grains, fruits, and vegetables they bear may be particularly advantageous in facilitating effective management of the resources.

SUMMARY

An aspect of an embodiment of the disclosure relates to providing a system for monitoring the condition of plants by listening to sounds that the plants make. In an embodiment, the system, hereinafter also referred to as a "Plant-monitor", comprises an array of sound collectors, optionally microphones or piezoelectric transducers, configured to generate signals responsive to sounds that plants make. The system comprises a processor configured to receive and process the signals to identify the type of plants making the sounds and/or to determine a status of the plants making the sounds. In an embodiment the processor uses a classifier to identify types of plants vocalizing the sounds and/or evaluate indications of plant status. Plant status may by way of example be based on at least one or any combination of more than one of indications of strain due to drought stress, structural damage which may be brought about by violent weather and/or by infestation of pests, as well as plant maturity, density of foliage, and/or fruit.

Optionally, the plant sounds are ultrasonic sounds in a band from about 20 kHz to about 100 kHz, from about 40 kHz to about 70 kHz, or from about 40 kHz to about 60 kHz. In an embodiment the plurality of sound collectors are operated as a phased array acoustic antenna controllable to spatially scan a field of plants and acquire plant sounds as a function of location in the field.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIG. 6A and FIG. 6B show confusion matrices of accuracy of identifying noise and plant sounds and indicating plant status, respectively, in accordance with an embodiment of the disclosure.

DETAILED DESCRIPTION

In the detailed discussion below operation of a Plant-monitor comprising a plurality of sound collectors, optionally operating as a phased array, to acquire and analyze sounds made by plants in a field is discussed with reference to FIG. 1. FIG. 2 shows an experimental system used for recording and analyzing sounds made by tomato and tobacco plants under stress from drought and physical damage. Results of experiments carried out using the system shown in FIGS. 1-2 that show that the plants and the stresses to which they are subjected can be distinguished by their sounds are discussed with reference to data shown in FIGS. 3A-6B.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1:
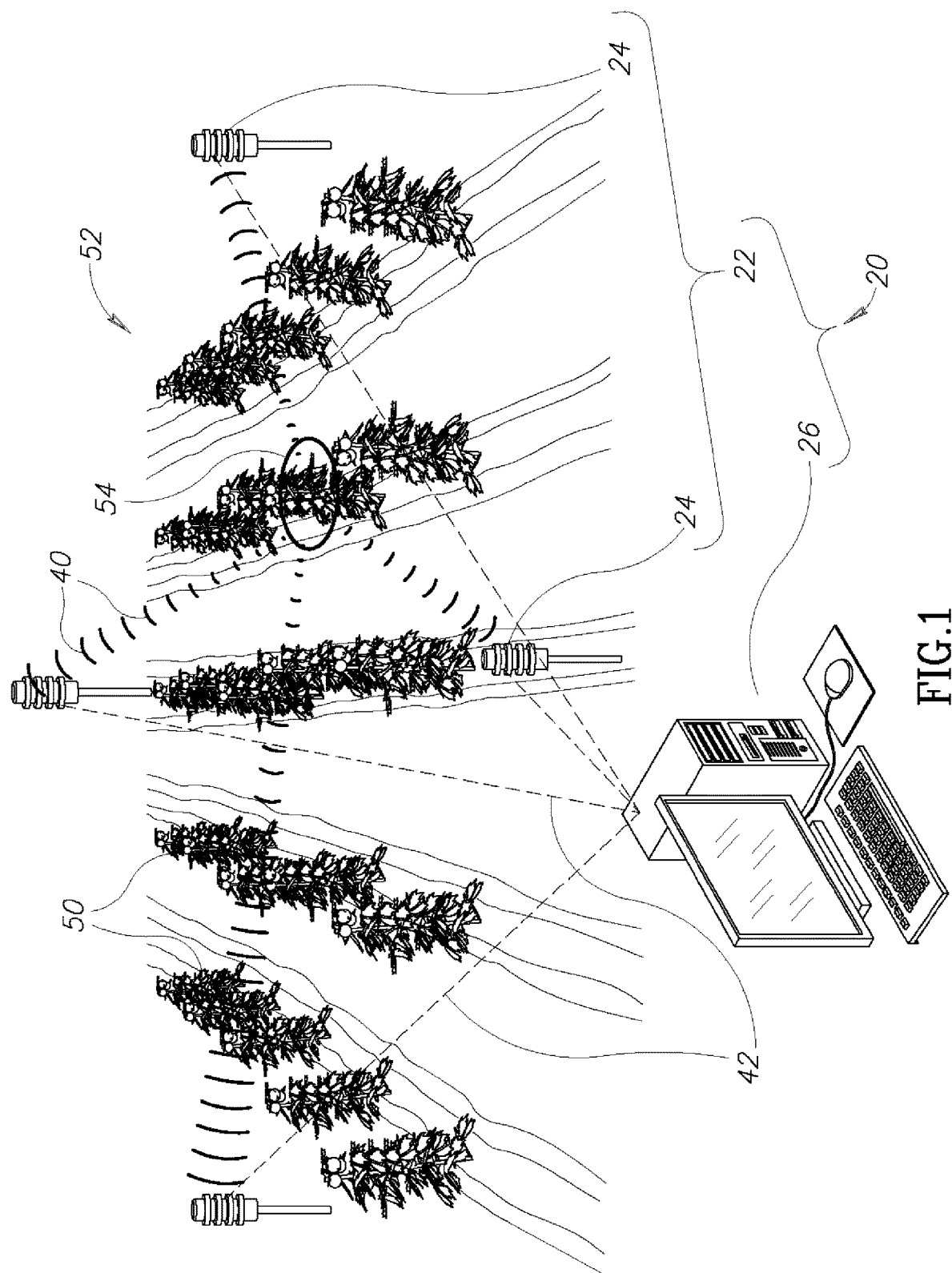
FIG. 1 schematically shows a Plant-monitor scanning a field of plants to acquire and process plant sounds as a function of location in the field, in accordance with an embodiment of the disclosure.
Figure 2:
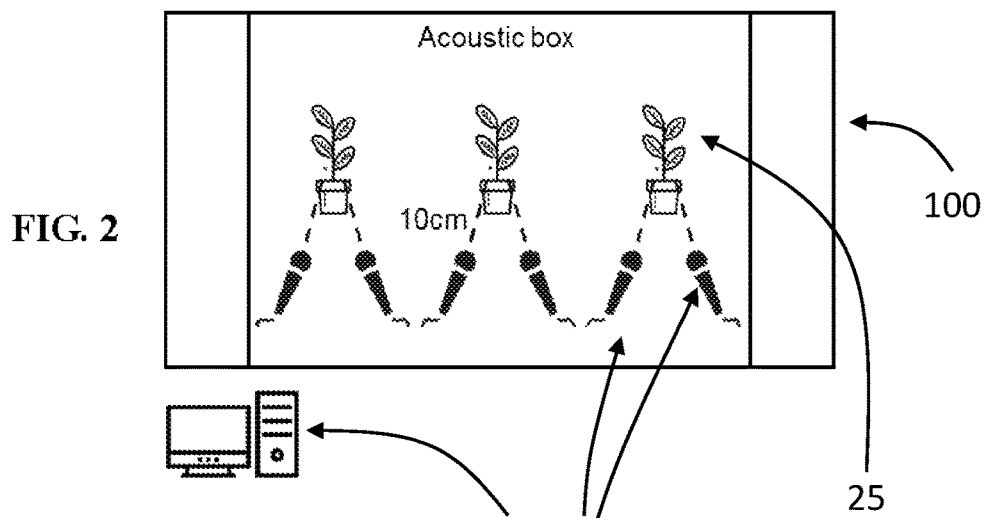
FIG. 2 schematically shows an experimental setup for acquiring sounds made by, optionally tomato and tobacco, plants respectively challenged by different drought stress and physical injury, in accordance with an embodiment of the disclosure.

FIG. 1 schematically shows a Plant-monitor system 20 being used to monitor plant health and detect injury and/or strain to plants 50 in a field 52 of the plants as a function of their location in the field. Plant-monitor system 20 optionally comprises an array 22 of sound collectors 24 configured to generate signals responsive to sounds, schematically represented by beams of concentric arcs 40, made by the plants and transmit the signals to a computer system 26 for processing. The signals may be transmitted to computer system 26 via wire or wireless channels represented by dashed lines 42. Generating signals responsive to the plant sounds may be referred to as acquiring a soundtrack of the sounds or acquiring the sounds, and processing the signals may be referred to as processing the sounds. A sound collector of sound collectors 24 may be, by way of example, a microphone or a piezoelectric transducer.

In an embodiment computer system 26 may control sound collectors 24 to operate in a phased mode to scan field 52 and acquire soundtracks of the sounds 40 of plants 50 as a function of their location in field 52. By way of example, in FIG. 1 sound collector array 22 is shown controlled by computer system 26 to acquire plant sounds from a region of field 52 indicted by a circle 54.

Optionally a sound collector of sound collectors 24 may be mounted on a mobile platform (not shown), by way of example a ground-based vehicle or an aerial vehicle such as a quadcopter or a drone. Optionally, the mobile platform is remote-controlled by a human operator, is semi-autonomous, or is fully autonomous. Optionally, the mobile platform is controlled by computer system 26.

Optionally, the acquired plant sounds comprise airborne sounds generated within a stem of the plant that can be recorded from a distance, by way of example about 5 centimeters, about 10 centimeters, about 25 centimeters, about 50 centimeters, or about 100 centimeters from the stem. The sound collectors may be placed in the field so that they are positioned appropriately to record sounds emanating from the stem of one or more selected plants. In configurations for which a sound collector of the sound collectors is mounted on a mobile platform, computer system 26 may be configured to control the mobile platform to position itself and the sound collector to be appropriately positioned to record sounds emanating from the stem of one or more selected plants.

In an embodiment computer system 26 processes the sounds to generate a profile of the one or more plants producing the sounds, the profile comprising an identity of one or more different types of plants in field 52, and/or their respective status, optionally as a function of their location. Optionally, the computer system processes the signals to generate a set of features that characterize the sounds, optionally as a function of location. The computer system may use a classifier to process feature vectors based on the set of features to identify the different types of plants and to determine their respective statuses, optionally as a function of location. The plant identity is optionally a plant species. The status of the plant may comprise one or any combination of more than one of a state of hydration, structural integrity, plant maturity, density of foliage, level of pathogen infection, herbivore damage, and/or density of fruit.

The feature vectors may comprise at least one or any combination of more than one of a fundamental frequency, a max intensity, a mean intensity, a variance of intensity, a duration of the sound, a frequency or count of sound incidence, a variance of intervals between sounds, and an inter-quartile range of sound duration. Additionally or alternatively, the feature vectors may comprise one or more features generated by an algorithm that reduces dimensionality of a signal based on the sounds. The one or more features may be generated by a Mel Frequency Cepstral Coefficient (MFCC) algorithm or a function thereof, a wavelet scattering convolution network, a stacked autoencoder, or an embedding algorithm.

In an embodiment, the recordings are filtered, by hardware means or software means, to select for sounds within a desired frequency range for further analysis in computer system 26. Optionally, the desired frequency ranges from about 20 kHz to about 100 kHz, from about 40 kHz to about 70 kHz, or from about 40 kHz to about 60 kHz. Sound collectors 24 may comprise or be operatively connected to one or more amplifiers and/or band pass filters as appropriate for transmitting signals generated by a defined range of frequencies to computer system 26. Additionally or alternatively, computer system 26 may comprise electronic sound filtering and amplification functionalities to filter the soundtrack so that only sounds within a desired range of frequencies is kept for further analysis. In an embodiment, computer system 26 filters recordings of plant-generated sounds to filter non-plant-generated background sounds that may be produced in field 52. Background sounds may, by way of example comprise sounds generated by wind, farm equipment operation, animals such as birds and insects, and the like. Optionally, the filtering is performed using a classifier trained to distinguish background sounds from plant-generated sounds.

The classifiers used to determine the status or identity of the plants that generated the sounds being analyzed, or to filter the plant recordings, may be one or more of: an artificial neural network (ANN) classifier by way of example a convolutional neural network (CNN) or a deep neural network (DNN), a support vector machine (SVM) classifier, a Linear Predictive Coding (LPC) classifier, and/or a K Nearest Neighbors (KNN) classifier.

In an embodiment, computer system 26 analyzes recordings comprising airborne sounds generated in a stem of a plant (or group of plants) to determine the species of the plant and/or to determine whether the plant was well irrigated, drought-stressed, or severed close to the ground.

Optionally, the feature vector comprises features based on descriptors of the recorded plant-generated sounds determined using a wavelet scattering convolution network.

In an embodiment computer system 26 analyzes recordings comprising airborne sounds generated in a stem of a plant (or group of plants) to determine whether the plant was well irrigated, drought-stressed, or severed close to the ground based on a count or frequency of incidence of the plant-generated sound.

Computer system 26 may operate to manage plants 50 in field 52 based on the determined plant identities and their statuses. The plants in Field 52 may be managed by controlling, by way of example, irrigation, application of fertilizer, or application of pesticides. For example, computer system 26 may determine substantially in real-time responsive to acquired plant sounds that plants in a first region of field 52 are suffering from drought stress, and that plants in a second region are suffering from exposure to excessive soil water. In response, the computer system may control an irrigation system (not shown) to increase provision of water to the first region and decrease provision of water to the second region. Computer system 26 may also control sound collector array 22 to operate as an array of acoustic transmitters and focus sound at a first frequency and intensity in the first region that may cause the plants in the first region to reduce their stomata openings and reduce their rate of water loss. The computer system may focus sound of a second intensity and frequency that may cause plants in the second region to increase their stomata openings to increase a rate at which they lose water. By way of another example, computer system 26 may determine, substantially in real time, that plants 50 in a third region of field 52 are being physically damaged by pest infestation. In response the computer system may operate to dispatch a robot (not shown) to the third region to spray the region with a pesticide and/or to patrol the region to scare the pests off by frequently appearing in the region. By way of another example, computer system 26 may determine, substantially in real time, that plants 50 in a fourth region of field 52 are not growing as robustly in terms of foliage or fruit production. In response the computer system may operate to dispatch a robot (not shown) to the fourth region to apply fertilizer to the region. By way of another example, computer system 26 may determine, substantially in real time, that a species of plants 50 in a fourth region of field 52 does not match an intended species, indicating weed proliferation. In response the computer system may operate to dispatch a robot (not shown) to the fourth region to spray the region with an herbicide, optionally an herbicide that is well-tolerated by the intended species.

Example 1

FIG. 2 shows a schematic of an experimental plant monitor 21 in accordance with an embodiment of the disclosure, including six microphones 24 for recording and processing plant sounds as well as a computer system 26 configured to digitize, record, and process sounds captured by the microphones. The plants 25 and microphones 24 are placed inside an acoustically isolated box ("acoustic box") 100.

The results shown in FIGS. 3A-5E were acquired with the following equipment: The microphones used were condenser CM16 ultrasound microphone (Avisoft). The recorded sound was digitized using an UltraSoundGate 1216H A/D converter (Avisoft) and stored on a PC. The sampling rate was 500 KHz per channel, and a high-pass filter 15 KHz was used. Two microphones were directed at each plant stem from a distance of 10 centimeters (cm), and instance of sound recording in a microphone was triggered with a sound exceeding 2% of the maximum dynamic range of the microphone. In subsequent analysis, only sounds that were recorded by both microphones were considered as a "plant sound".

In each of a plurality of recording sessions using Plant monitor 21, three plants 25 were placed inside the acoustic box, with two microphones directed at each plant to eliminate false recordings. The interior of acoustic box 100 was limited to the plants being recorded, microphones 24, and Plant sounds in the ultrasonic sound range, between 15-250 KHz (kilohertz) for which ambient noise is less common, were recorded. The recorded sounds were generated by tomato (*Solanum lycopersicum*) and tobacco (*Nicotiana tabacum*) plants that were grown normally in a pot, subjected to drought stress, or subjected to damage by severing their stalks close to the ground. All plants were grown in a growth room at 25 degrees Celsius (deg. C.), and were tested at 5-7 weeks after germination.

Figure 3A:
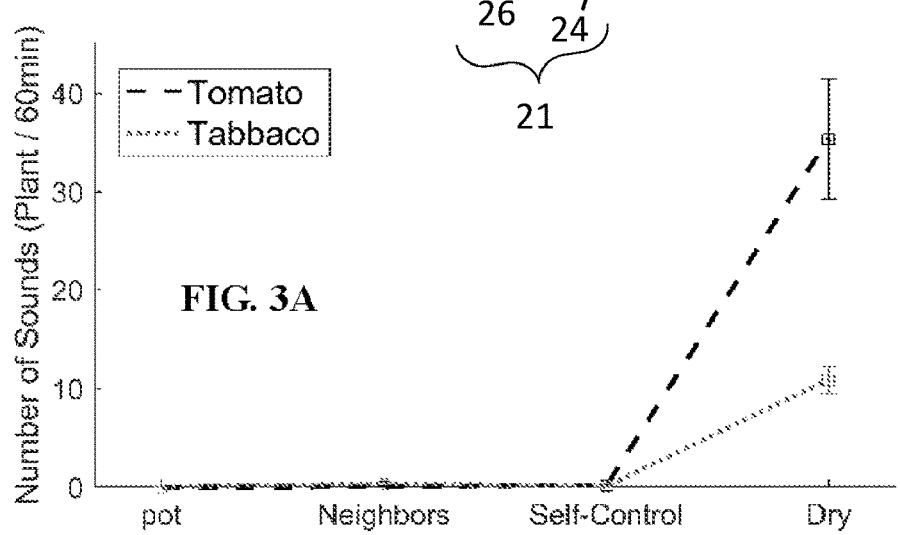
FIG. 3A shows a graph of a number of sounds per hour made by tomato and tobacco plants challenged by drought, the sounds acquired by the experimental set up shown in FIG. 2, in accordance with an embodiment of the disclosure.

Reference is made to FIG. 3A. Sounds recorded from drought-stressed and control plants showed that drought-stressed plants emit significantly more sounds than control plants ($p<e-7$, Wilcoxon test). A drought experiment was performed in which all the plant sounds were recorded twice: a first recording session of 1 hour before drought treatment, and a second recording session (1 hour) after half of the plants experienced drought stress in the form of 4-6 days without being watered until the soil moisture in the un-watered plants decreased to 5% of pre-drought levels. It was found that the mean number of sounds emitted by drought-stressed plants during one hour was $35.4\pm6.1$ and $11.0\pm1.4$ sounds for tomato and tobacco plants respectively (FIG. 3A). In contrast, the mean number of sounds emitted under control conditions was less than 1 per hour. Three controls were used: recording from the same plant before drought treatment (self-control), recording from a normally-watered same-species plant placed next to the drought-stressed plant (neighbor-control), and recording from an empty pot without a plant (Pot). Between 20 and 30 plants were sampled for each group.

Figure 3B:
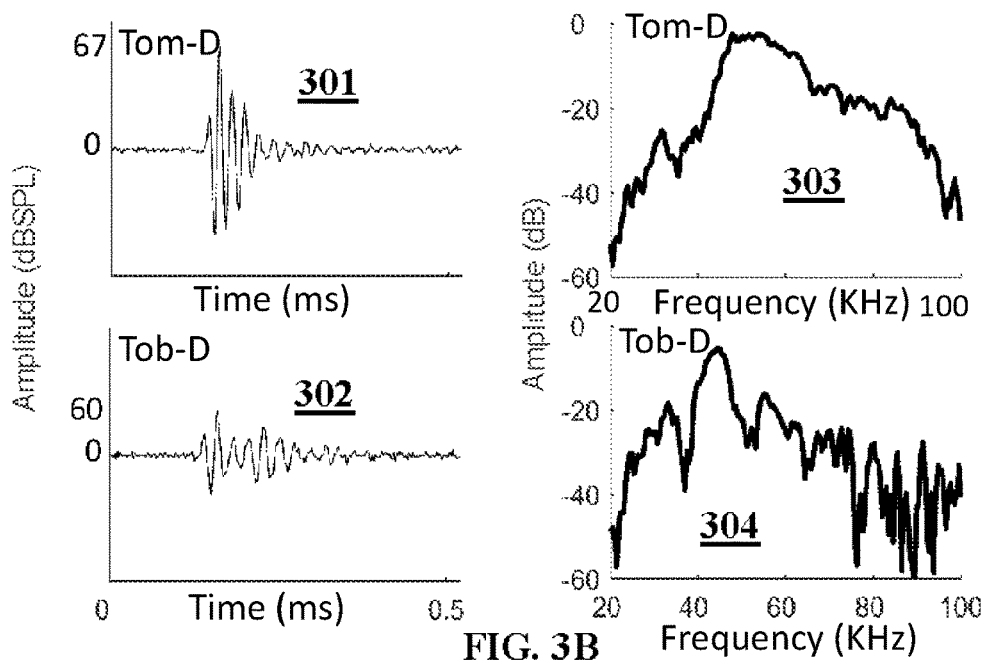
FIG. 3B shows graphs of the amplitude and frequency distributions of the sounds graphed in FIG. 3A, in accordance with an embodiment of the disclosure.

Examples for a sound emitted by drought-stressed plants as a function of time are shown in graphs 301 (tomato) and 302 (tobacco) respectively in FIG. 3B. Frequency spectra for the emitted sounds are respectively shown in graphs 303 (drought-stressed tomato) and 304 (drought-stressed tobacco). For the drought-stressed tomato plants, the mean intensity of tomato plant sounds (FIG. 3B graph 301) was $61.6\pm0.1$ DBSPL (decibel sound pressure level) at 10.0 cm distance from the tomato plants, with a mean frequency of $49.6\pm0.4$ KHz, (FIG. 3B graph 302). Mean intensity of tobacco sounds was $65.6\pm0.4$ DBSPL (FIG. 3B graph 303) at 10.0 cm with a mean frequency of $54.8\pm1.1$ KHz (FIG. 3B graph 304).

Similarly to drought-stressed plants, cut plants also emitted significantly more sounds compared to control conditions ($p<e-7$, Wilcoxon test). Plants included in the treatment group were cut with scissors close to the ground immediately preceding the experimental recording session and sounds made by the stalk in the severed part of the plant, disconnected from the roots, was recorded. The pot soil was kept moist. As with the drought-stressed experiment, three controls were used: recording from the same plant before severing (self-control), recording from a normally-watered same-species plant placed next to the severed plant (neighbor-control), and recording from an empty pot without a plant (Pot). Between 20 and 30 plants were sampled for each group.

Figure 4A:
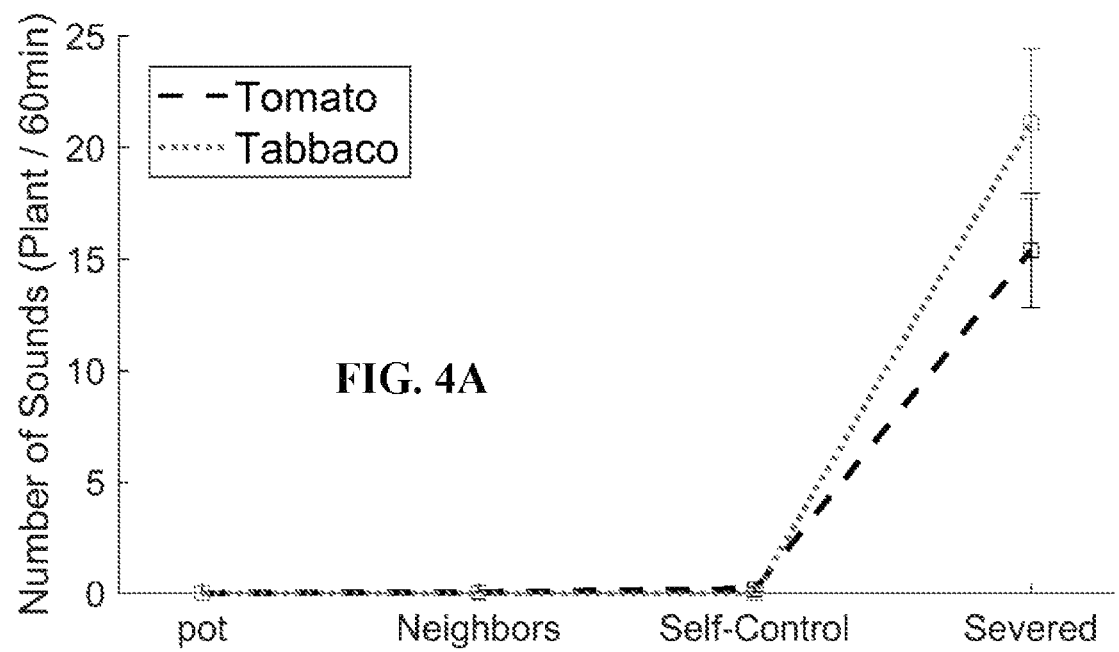
FIG. 4A shows a graph of a number of sounds per hour made by tomato and tobacco plants that have been damaged acquired by the experimental set up shown in FIG. 2, in accordance with an embodiment of the disclosure.
Figure 4B:
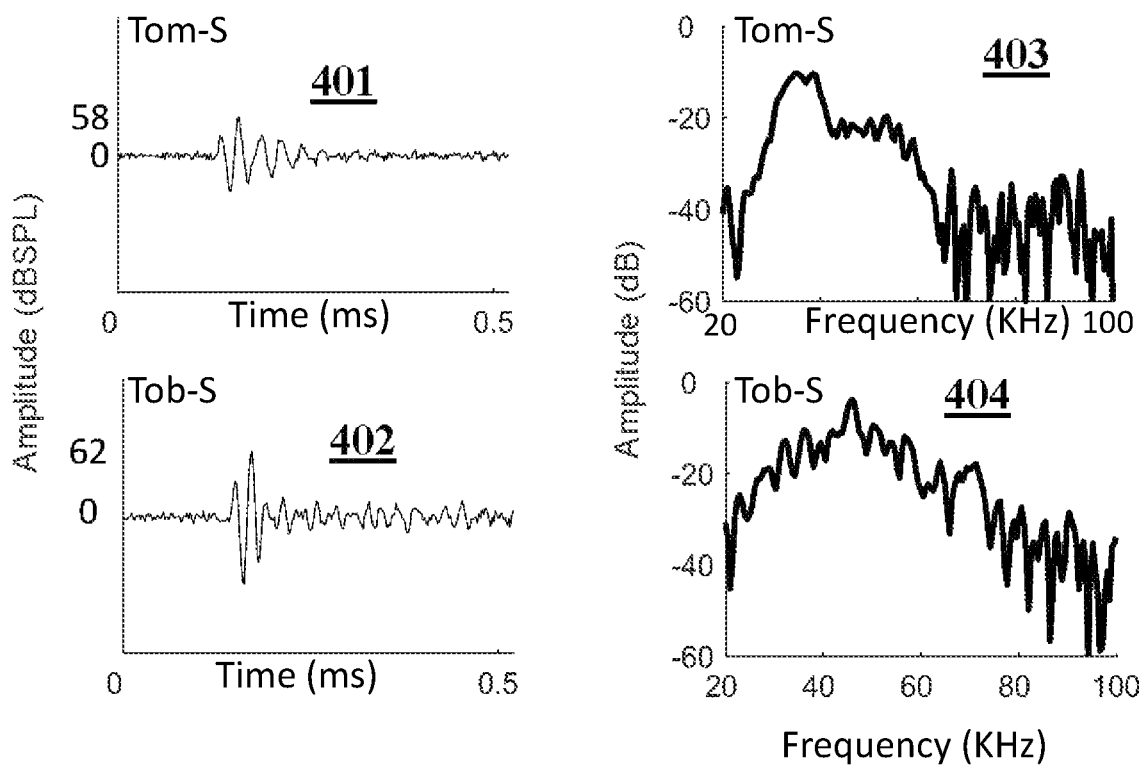
FIG. 4B shows graphs of the amplitude and frequency distributions of the sounds graphed in FIG. 4A, in accordance with an embodiment of the disclosure.

Reference is made to FIG. 4A. It was found that severed plants emitted 15.2±2.6 and 21.1±3.4 sounds during one hour for tomato and tobacco plants respectively. A mean number of sounds emitted by control plants was less than 1 per hour (FIG. 4A). Sounds produced by cut tomato plants were characterized by a mean intensity of 65.6±0.2 DBSPL measured at 10.0 cm (FIG. 4B graph 401) and a mean peak frequency of 57.3±0.7 KHz, (FIG. 4B graph 403). Sounds produced by cut tobacco plants were characterized by a mean intensity of 63.3±0.2 DBSPL measured at 10.0 cm (FIG. 4B graph 402) and a mean peak frequency of 57.8±0.7 KHz (FIG. 4B graph 404).

It was also found that tomato plant branches that were severed from the rest of the plant also emitted substantially more sounds than intact branches.

It was also found that the stems of plants that were infected with a pathogen emitted substantially more sounds than healthy plants. Tomato plants were infected with of three different strains of *Xanthomonas*: *Xanthomonas euvesicatoria* (Xcv) 85-10, *Xanthomonas vesicatoria* (Xcv) T2, or *Xanthomonas vesicatoria* (Xcv) T2 comprising a plasmid expressing the avirulence effector AvrXv3. With each strain, the infected plants emitted substantially more sounds compared to the same plants before infection or neighboring healthy plants. Therefore, increased emission of stem-generated sound from intact, well-watered plants is an indication of pathogen infection.

It was also found that stem-generated sounds can be used to determine a developmental stage of a plant. Sounds generated by the stem of *Mamilarius ramosissima* plants were monitored over a period of time before and during blooming of flowers on the plants. Well-watered plants generally produced less than one sound per hour. However, a temporary increase in stem sound generation was consistently observed between 2 and 4 days prior to blooming. As such, a temporary increase in stem-generated sounds in well-watered, healthy, intact plants prior to flower blooming indicates impending flower blooming.

Figure 5A:
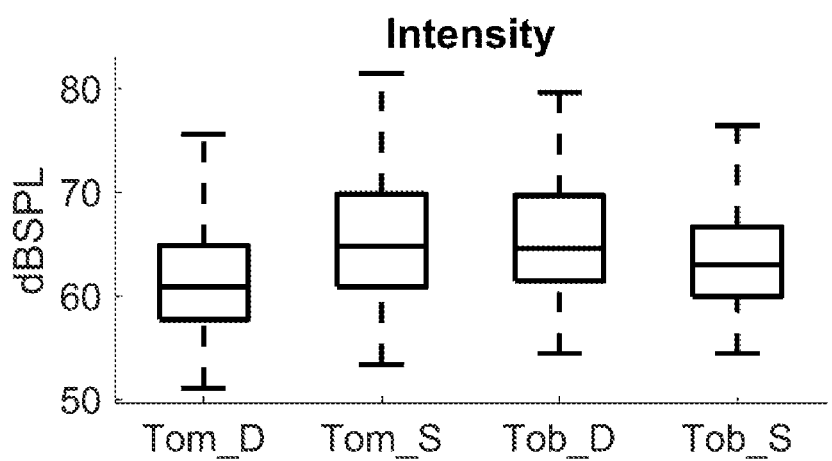
FIGS. 5A-5C show graphs of a mean and standard deviations for intensity, frequency, and duration of sounds respectively made by tomato and tobacco plants that are challenged by drought and physical damage, acquired by the experimental set up shown in FIG. 2, in accordance with an embodiment of the disclosure.
Figure 5B:
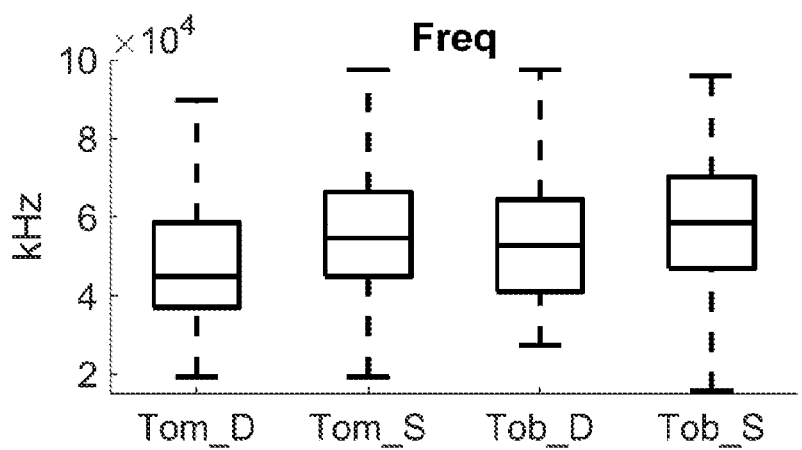
Figure 5C:
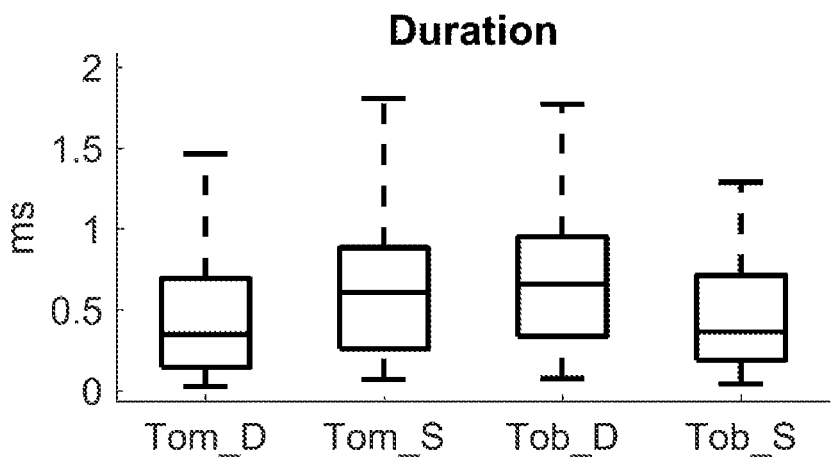

In accordance with an embodiment of the disclsoure the acquired tomato and tobacco sounds were analyzed using a trained classifier to distinguish plant sounds emitted by tomato and tobacco plants to indicate status of the plants. The sounds were divided into four groups according to the plant type; tomato (Tom), or tobacco (Tob), and the stress the plant suffered from when it emitted the sound, drought (D) or severing (S): Tom-D; Tom-S; Tob-D; and Tob-S. The distributions of the descriptors of max intensity (in dBSPL), fundamental frequency (in KHz), and sound duration (in milliseconds), for the four sound groups are shown in FIGS. 5A-5C, respectively.

For each of six pairs (Tom-D vs. Tom-S, Tob-D vs. Tob-S, Tom-D vs. Tob-D, Tom-D vs. Tob-S, Tom-S vs. Tob-D, Tom-S vs. Tob-S) of sound groups the classifier was trained to identify to which group of the pair of groups a given plant sounds belonged. Each plant sound was represented by a feature vector and the classifier operated on the feature vector representing a sound to determine to which group of plant sounds the sound belonged.

Figure 5D:
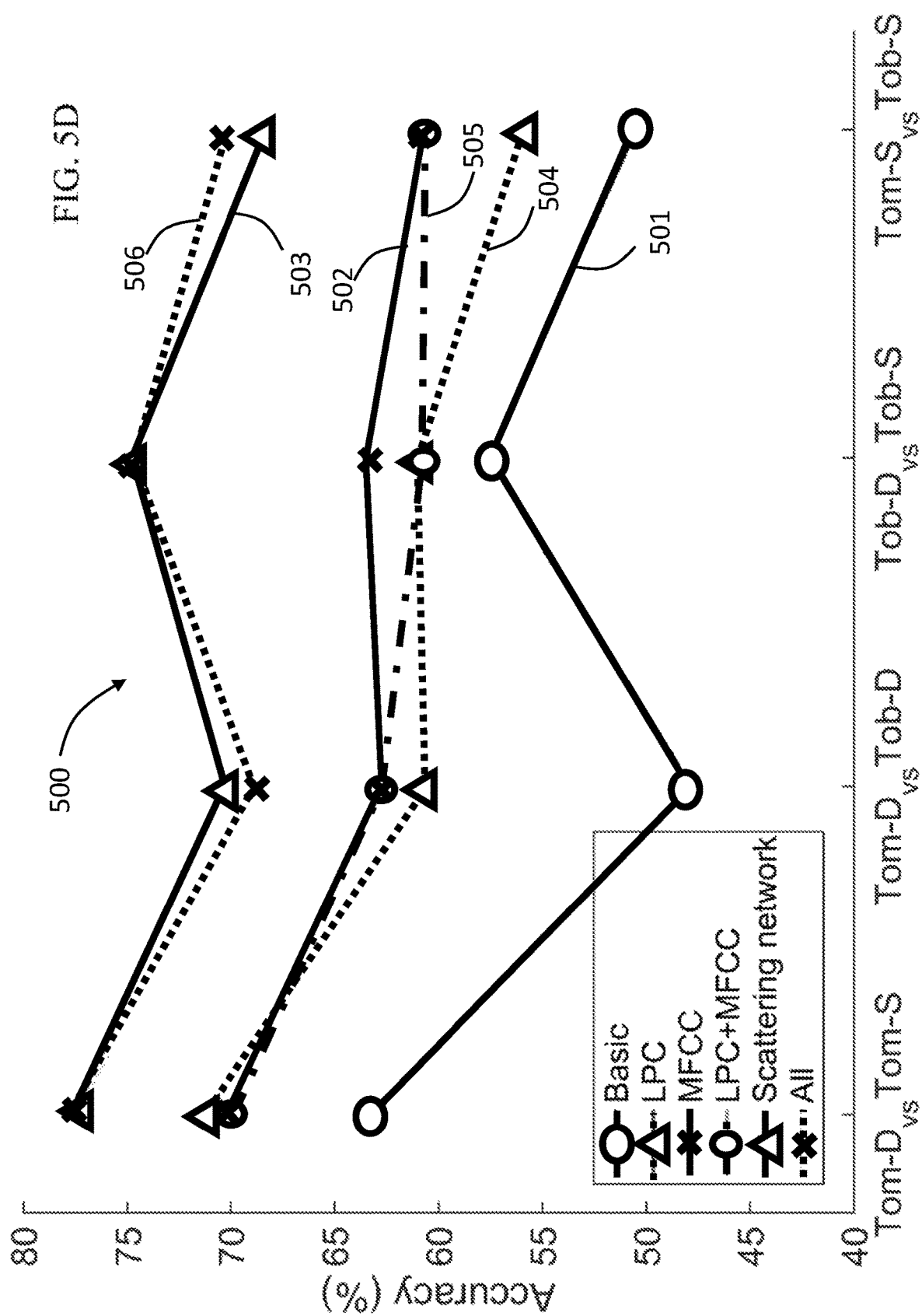
FIG. 5D shows a graph of accuracy in classifying sounds made by tomato and tobacco plants challenged by drought and physical damage by a support vector machine (SVM) operating on feature vectors based on different types of descriptors, in accordance with an embodiment of the disclosure.

Different types of feature vectors representing the sound recording from the four sounds groups were used to determine efficacy of different feature vectors for use in distinguishing the sounds. Reference is made to FIG. 5D, displaying a graph 500 showing accuracy of identification as a function of sound group pairs by applying a SVM classifier to the different types of feature vectors.

A first feature vector ("Basic") was based on a small set of basic physical descriptors of the sounds such as fundamental frequency, max intensity and sound duration. Using the basic physical descriptors alone, the SVM classifier obtained a maximum accuracy between about 45-65% for identifying sounds in a pair of sound groups. Accuracy of identification as a function of sound group pair using the SVM classifier is given by a graph line 501 in FIG. 5D. A second feature vector ("MFCC") was based on Mel Frequency Cepstral Coefficients (MFCC), descriptors. Using the second MFCC feature vector, a SVM classifier attained 60-70% accuracy (graph line 502 in FIG. 5D). A third feature vector ("Scattering") was based on descriptors determined using a wavelet scattering convolution network, which provides a locally translation invariant representation, stable to time-warping deformations. The wavelet scattering network extends the MFCC representations by computing modulation spectrum coefficients of multiple orders using a cascade of wavelet filter banks and modulus rectifiers. Using the third Scattering feature vector, the SVM classifier, as shown by a graph line 503 in graph 500, achieved accuracy between about 70-80%. Accuracy obtained using features determined by Linear Predictive Coding (LPC), is shown by a graph line 504 in graph 500, and accuracy obtained using operating on a feature vector comprising LPC and MFCC features is given by a graph line 505 in graph 500. A graph line 506 shows accuracy of results obtained by an SVM classifier operating feature vectors comprising LPC, MFCC, scattering network and basic features. Particularly advantageous results were obtained by an SVM classifier operating on the third, wavelet scattering network feature vectors (graph line 503 in FIG. 5D). It was also found that all classifiers tested robustly distinguished plant-generated sounds from noise, with an accuracy of 90% or greater.

Figure 5E:
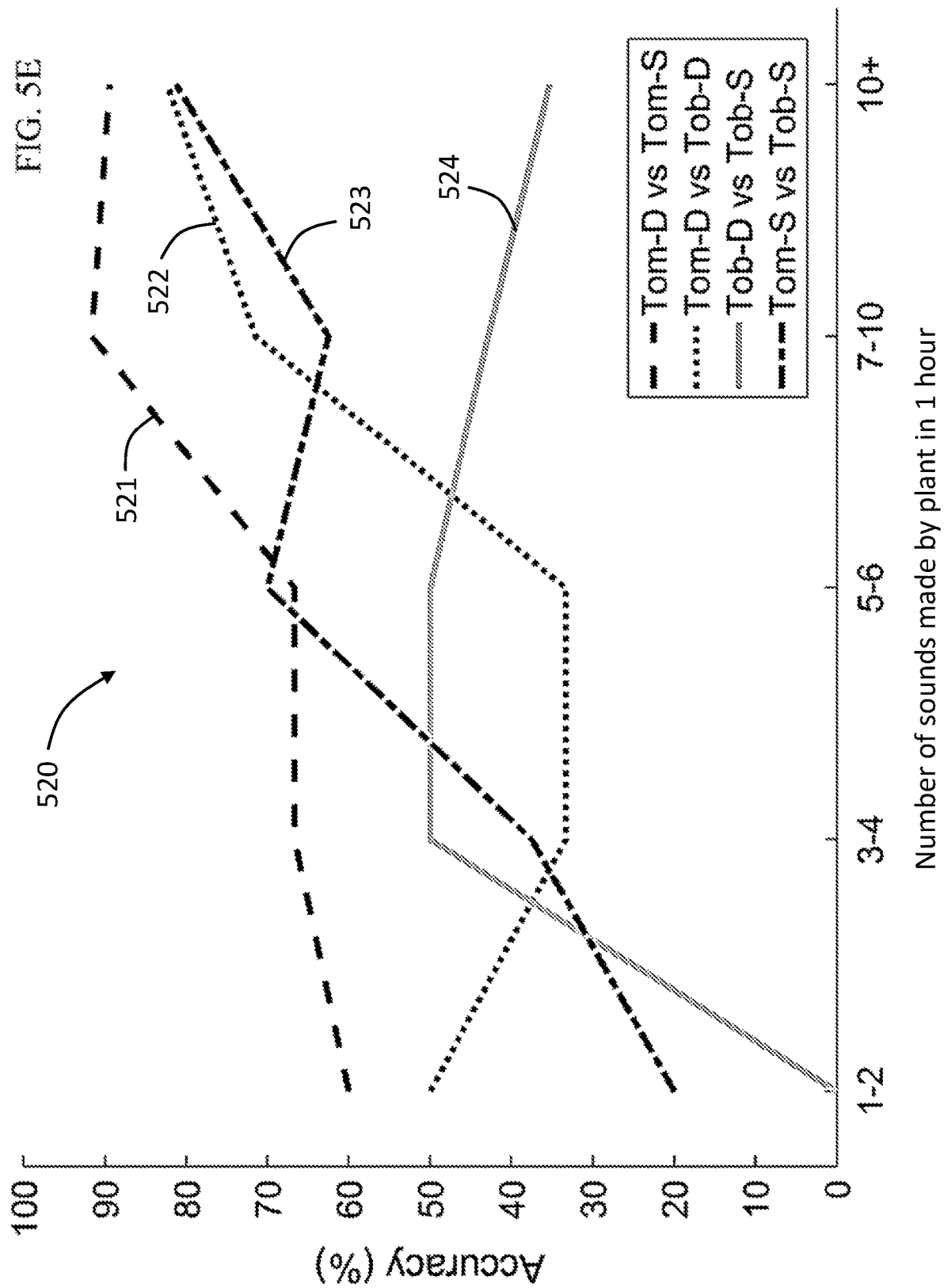
FIG. 5E shows a graph of accuracy in classifying sounds made by tomato and tobacco plants challenged by drought and physical damage by a support vector machine (SVM) as a function of number of sounds recorded for the plants, in accordance with an embodiment of the disclosure.

FIG. 5E shows a graph 520 of accuracy of classification of plant-generated sounds, from an hour of recording, as belonging to one of the groups of sounds described above, tomato-drought (Tom-D), tomato-severed (Tom-S), tobacco-drought (Tob-D), tobacco-severed (Tob-S), in a pair of groups as a function of a number of sounds recorded for the plant in an hour. The sounds made by the plant were classified using a SVM classifier and wavelet scattering network feature vector and a majority vote of classifications of all sounds that the plant emitted during the hour. Accuracy of classifying sounds made by a plant as belonging to one of the groups in group pairs (Tom-D)-(Tom-S), (Tom-D)-(Tob-D), (Tom-S)-(Tob-S), and (Tob-D)-(Tob-S) are given as functions of number of sounds made by the plant during an hour by graph lines 521, 522, 523, and 524 respectively. From graph 520 it may be seen that plants that emitted 10 or more sounds in an hour were classified correctly 80-90% of the time in terms of their species and/or condition.

The experimental results indicate that plant species may be identified by sounds they make and that the sounds may be used to determine status of the plants. In an embodiment of the disclosure a Plant-monitor may have a memory stored with a library of characterizing feature vectors for different plants and different status of the plants. The library feature vectors may be used to process plant sounds to identify the plants making the sounds and to provide an indication of the status of the plants.

Example 2

Another experimental Plant monitor (not shown), similar to Plant monitors 20 and 21, was used to record sounds generated by tomato plants in a more natural environment, in a greenhouse without an acoustic isolation box to prevent ambient noise from being recorded together with plant-generated sounds. The sound recording equipment was the same as used in Example 1. A noise sounds library of background noise was first generated by recording inside an empty greenhouse for several days. A classifier based on a convolution neural network (CNN) was trained using the pre-recorded greenhouse noise and pre-recorded tomato sounds recorded in an acoustic isolation box to distinguish between tomato-generated sounds and greenhouse noise with a balanced accuracy score of 99.7%. The balanced accuracy score is a percentage score calculated by subtracting from a theoretical perfect accuracy rate of 100% a balanced failure rate calculated as a mean of the false positive rate and the false negative rate. An analysis of 1622 greenhouse noise recordings and 1378 tomato plant-generated sound recordings with the trained CNN classifier resulted in a false positive rate of 0.4% in which the classifier mis-identified greenhouse noise to be a plant-generated sound and a false negative rate of 0.2% in which the classifier misidentified plant-generated sounds to be greenhouse noise, resulting in a balanced failure rate of 0.3%. A confusion matrix of the above-noted results of analyzing the sounds to detect greenhouse noise with the CNN classifier is shown in FIG. 6A. An SVM classifier trained on the same data was also able distinguish between tomato-generated sounds and greenhouse noise with similar accuracy. A successfully trained classifier capable of accurately detecting greenhouse noise as described hereinabove may be generically referred to herein as a "greenhouse noise-detecting classifier" ("GND classifier")

Subsequently, 1-hour recordings of drought-stressed and normally irrigated tomato plants were made in the greenhouse. As in Example 1, two microphones were directed at each plant stem from a distance of 10 cm, and instance of sound recording in a microphone was triggered with a sound exceeding 2% of the maximum dynamic range of the microphone. In subsequent analysis, only sounds that were recorded by both microphones were considered as a "plant sound". The sounds made by the normally-irrigated plants were recorded 1 day after irrigation. Sounds made by the drought-stressed plants were recorded after the plants were left unirrigated for 5 days prior. The recordings were filtered using a CNN-based GND classifier to remove greenhouse noise and the condition of the plants from which the recordings were made was determined to be drought-stressed or normally irrigated based on the count or frequency of the plant-generated sounds in hour-long recordings filtered by the GND classifier. Filtered recordings containing 3 or more tomato plant-generated sounds during the 1-hour recording duration were classified as being recorded from drought-stressed plants, and filtered recordings containing 2 or fewer tomato plant-generated sounds during the 1-hour recording duration were classified as being recorded from normally irrigated plants. The above-described classification process resulted in a balanced accuracy score of ~84.4% for distinguishing between 25 normally irrigated (control) plant recordings and 26 drought-stressed plant recordings. The analysis based on sound count resulted in a false positive rate of 12% in which recordings from normally irrigated tomato plants were mis-identified as being from drought-stressed tomato plants and a false negative rate of 19.2% in which recordings from drought-stressed tomato plants were mis-identified as being from normally-irrigated tomato plants. A confusion matrix of the above-noted results of analyzing the count of plant-generated sounds to determine normally-irrigated and drought-stressed plants is shown in FIG. 6B.

There is therefore provided in accordance with and embodiment of the disclosure a system for monitoring plants, the system comprising one or more sound collectors configured to receive and generate signals based on sounds produced by one or more plants; and a computer system configured to receive and process the signals to provide a profile of the one or more plants producing the sounds.

In an embodiment of the disclosure, plant profile comprises at least one or both of a plant identity and a plant status of the one or more plants. Optionally, the plant status comprises at least one or any combination of more than one of a state of hydration, structural integrity, plant maturity, density of foliage, level of pathogen infection, herbivore damage, and/or density of fruit.

In an embodiment of the disclosure, the computer system is configured to generate at least one feature vector having components to represent the sounds. Optionally, the components of a feature vector of the at least one feature vector comprise at least one or any combination of more than one of a fundamental frequency, a max intensity, a mean intensity, a variance of intensity, a duration of the sounds, a frequency or count of incidence of the sounds, a variance of intervals between sounds, and an inter-quartile range of sound duration. Optionally, the components of a feature vector of the at least one feature vector comprise one or more features generated by an algorithm that reduces dimensionality of a signal that operates on the sounds. Optionally, the one or more features are generated by a Mel Frequency Cepstral Coefficient (MFCC) algorithm or a function thereof, a wavelet scattering convolution network, a stacked autoencoder, or an embedding algorithm. Optionally, the one or more features are generated by a scattering convolution network. Optionally, the computer system is configured to process the at least one feature vector using at least one classifier to profile the one or more plants producing the sounds. Optionally, the at least one classifier comprises at least one or any combination of more than one of an artificial neural network (ANN), a support vector machine (SVM), Linear Predictive Coding (LPC), and/or a K Nearest Neighbors (KNN) classifier.

In an embodiment of the disclosure, an ANN is used as a feature extractor that filters out non-plant-generated sounds from the recorded signal.

In an embodiment of the disclosure, the one or more sound collectors comprises an array of sound collectors. Optionally, the computer system is configured to operate the array of sound collectors as a phased array to receive plant sounds from a limited spatial region. Optionally, the computer system is configured to operate the array of sound collectors as an array of speakers. Optionally, the computer system is configured to operate the array of speakers as a phased array of speakers to direct sound to a limited spatial region. Optionally, the sound is directed responsive to the plant profile of the one or more plants, the one or more plants optionally being located within the limited spatial region.

In an embodiment of the disclosure, the computer system is configured to initiate administration of an agricultural treatment to the one or more plants responsive to the plant profile of the one or more plants. Optionally, the agricultural treatment is selected from the group consisting of water, a pesticide, an herbicide or a fertilizer.

In an embodiment of the disclosure, a sound collector of the one or more sound collectors is mounted to a mobile platform. The mobile platform is optionally a ground-based vehicle or an aerial vehicle.

In an embodiment of the disclosure, the sound collector is a microphone or a piezoelectric transducer.

In an embodiment of the disclosure, the sound collector is configured to generated the signal responsive to sounds within a frequency range of from about 20 kHz to about 100 kHz. Optionally, the frequency range is from about 40 kHz to about 60 kHz.

There is also provided a method comprising: receiving sounds that plants make;

generating signals based on the sounds; and processing the signals to provide a profile of one or more plants producing the sounds. Optionally, the plant profile comprises at least one or both of a plant identity and a plant status. Optionally, plant status comprises at least one or any combination of more than one of a state of hydration, structural integrity, plant maturity, density of foliage, level of pathogen infection, herbivore damage, and/or density of fruit.

In an embodiment of the disclosure, the method comprises generating at least one feature vector having components to represent the sounds. Optionally, the components of a feature vector of the at least one feature vector comprise at least one or any combination of more than one of a fundamental frequency, a max intensity, a mean intensity, a variance of intensity, a duration of the sounds, a frequency or count of incidence of the sounds, a variance of intervals between sounds, and an inter-quartile range of sound duration. Optionally, the components of a feature vector of the at least one feature vector comprise one or more features generated by an algorithm that reduces dimensionality of a signal that operates on the sounds. Optionally, the one or more features are generated by a Mel Frequency Cepstral Coefficient (MFCC) algorithm or a function thereof, a wavelet scattering convolution network, a stacked autoencoder, or an embedding algorithm. Optionally, the one or more features are generated by a scattering convolution network. Optionally, the at least one feature vector is processed using at least one classifier to profile the one or more plants producing the sounds. Optionally, the at least one classifier comprises at least one or any combination of more than one of an artificial neural network (ANN), a support vector machine (SVM), Linear Predictive Coding (LPC), and/or a K Nearest Neighbors (KNN) classifier.

In an embodiment of the disclosure, an ANN is used as a feature extractor that filters out non-plant-generated sounds from the recorded signal.

In an embodiment of the disclosure, the signals are generated responsive to sounds within a frequency range of from about 20 kHz to about 100 kHz. Optionally, the frequency range is from about 40 kHz to about 60 kHz.

In an embodiment of the disclosure, the method comprises initiating administration of an agricultural treatment to the one or more plants responsive to the plant profile. Optionally, the agricultural treatment is selected from the group consisting of water, a pesticide, an herbicide or a fertilizer.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A system for monitoring stemmed plants, the system comprising:
   one or more sound collectors configured to receive airborne sounds produced by and propagated from one or more stemmed plants to the sound collectors over the air and generate signals based on the sounds; and
   a computer system configured to receive and process the signals to provide a profile of the one or more stemmed plants producing the sounds.

2. The system according to claim 1 wherein the plant profile comprises at least one or both of a plant identity and a plant status of the one or more stemmed plants.

3. The system according to claim 2 wherein the plant status comprises at least one or any combination of more than one of a state of hydration, structural integrity, plant maturity, density of foliage, level of pathogen infection, herbivore damage, and/or density of fruit.

4. The system according to claim 1 wherein the computer system is configured to generate at least one feature vector having components to represent the sounds.

5. The system according to claim 4 wherein the components of a feature vector of the at least one feature vector comprises at least one or any combination of more than one of a fundamental frequency, a max intensity, a mean intensity, a variance of intensity, a duration of the sounds, a frequency or count of incidence of the sounds, a variance of intervals between sounds, and an inter-quartile range of sound duration.

6. The system according to claim 4 wherein the components of a feature vector of the at least one feature vector comprise one or more features generated by an algorithm that reduces dimensionality of a signal that operates on the sounds.

7. The system according to claim 4 wherein the computer system is configured to process the at least one feature vector using at least one classifier to profile the one or more stemmed plants producing the sounds.

8. The system according to claim 1 wherein an ANN (artificial neural network) is used as a feature extractor that filters out non-plant-generated sounds from the recorded signal.

9. The system according to claim 1 wherein the one or more sound collectors comprises an array of sound collectors.

10. The system according to claim 9 wherein the computer system is configured to operate the array of sound collectors as a phased array to receive plant sounds from a limited spatial region.

11. The system according to claim 10 wherein the computer system is configured to operate the array of sound collectors as an array of speakers and the computer system is configured to operate the array of speakers as a phased array of speakers to direct sound to the limited spatial region responsive to the profile of the one or more stemmed plants within the limited spatial region.

12. The system according to claim 1 wherein the computer system is configured to initiate administration of an agricultural treatment to the one or more stemmed plants responsive to the plant profile of the one or more stemmed plants.

13. The system according to claim 12, wherein the agricultural treatment is selected from the group consisting of water, a pesticide, an herbicide or a fertilizer.

14. The system according to claim 1 wherein a sound collector of the one or more sound collectors is mounted to a mobile platform.

15. The system according to claim 14, wherein the mobile platform is a ground-based vehicle or an aerial vehicle.

16. The system according to claim 1, wherein the signal is generated responsive to sounds within a frequency range from about 20 kHz to about 100 kHz.

17. A method for monitoring stemmed plants, the method comprising:

receiving airborne sounds produced and propagated over the air by one or more stemmed plants;

generating signals based on the sounds; and processing the signals to provide a profile of one or more stemmed plants producing the sounds.

18. The method according to claim 17 wherein the plant profile comprises at least one or both of a plant identity and a plant status.

19. The method according to claim 18 wherein the plant status comprises at least one or any combination of more than one of a state of hydration, structural integrity, plant maturity, density of foliage, level of pathogen infection, herbivore damage, and/or density of fruit.

20. The method according to claim 17, comprising initiating administration of an agricultural treatment to the one or more stemmed plants responsive to the plant profile.

* * * * *